United States Patent [19]
Van Allman et al.

[11] Patent Number: 5,658,109
[45] Date of Patent: Aug. 19, 1997

[54] STEEL PIN AND METHOD FOR ITS MANUFACTURE

[75] Inventors: Don T. Van Allman, Palatine, Ill.; James H. Syvarth, Lexington, Ky.; William M. Heflin, Paris, Ky.; Ronnie L. McConnell, Mount Oliver, Ky.

[73] Assignee: Illinois Tool Works Inc., Glenview, Ill.

[21] Appl. No.: 467,026

[22] Filed: Jun. 6, 1995

Related U.S. Application Data

[63] Continuation-in-part of Ser. No. 262,475, Jun. 20, 1994, abandoned.

[51] Int. Cl.$^6$ .............................. F16B 15/00; F16B 19/14
[52] U.S. Cl. ........................ 411/440; 411/493; 411/499
[58] Field of Search ............................ 411/440, 441, 411/493, 498, 499

[56] References Cited

U.S. PATENT DOCUMENTS

| | | | |
|---|---|---|---|
| 2,751,808 | 6/1956 | MacDonald et al. | 411/493 |
| 4,802,802 | 2/1989 | Thurner | 411/441 X |
| 4,915,561 | 4/1990 | Buhri et al. | 411/441 |
| 4,979,858 | 12/1990 | Van Allman et al. | 411/441 |

OTHER PUBLICATIONS

The Penetration of Thick Steel Plates by Ogive Shaped Projectiles –Dikshit – 1992.
Normal Impact and Perforation of Thin Plates by Hemispherically Tipped Projectiles Levy, 1984.
Studies in Penetration Mechanics – Batra, 1989.
Impact Models for Penetration and Hole Growth–Walters, 1978.
Penetration of Concrete Targets – Forrestal, 1993.
An Empirical Equation for Penetration Depth of Ogive–Nose Projectiles Into Concrete Targets–Forrestal, 1993.
Baumeister et al., Marks' Standard Handbook for Mechanical Engineers, Eighth Edition, McGraw–Hill Book Company, New York (1978) at pp. 13–73 through 13–79.
ASTM Standard Specification for Structural Steel (1969) at pp. 78 through 81 (Specification A36–69).

*Primary Examiner*—Neil R. Wilson
*Attorney, Agent, or Firm*—Schwartz & Weinrieb

[57] ABSTRACT

A steel pin is disclosed of a type to be forcibly driven into a steel substrate via a powder-actuated tool. The steel pin has a substantially cylindrical shank and a substantially sharp point, which extends from one end of the substantially cylindrical shank, which conforms substantially to a tangent or secant ogive except for a substantially spherical tip having a radius in a range of about 0.015 inch (about 3.75 millimeters) to about 0.03 inch (about 7.5 millimeters), which has substantially true concentricity, which has surface-texture irregularities with a roughness-height index value not greater than about 30 microinches (about 0.76 micrometers), and which appears to be substantially free of other surface imperfections when viewed under 60× magnification. Optimally, the ogive is a tangent ogive with an ogive radius about ten times the shank diameter and with an ogive length about twice the shank diameter, and the tip radius is about 0.1 times the shank diameter. The substantially cylindrical shank is joined to the substantially sharp point at a transition having a substantially smooth, continuously curved surface, and is knurled near the transition. The steel pin is made by deforming a length of steel wire, as by forging or swaging, so as to form the steel pin with the substantially cylindrical shank and with the substantially sharp point and reshaping the substantially pointed end, as by barrel finishing.

26 Claims, 5 Drawing Sheets

STEEL PIN AND METHOD FOR ITS MANUFACTURE

CROSS-REFERENCE TO RELATED APPLICATION

This application is a continuation-in-part of U.S. patent application Ser. No. 08/262,475, which was filed on Jun. 20, 1994, now abandoned, and the disclosure of which is incorporated herein by reference.

Technical Field of the Invention

This invention pertains to a steel pin of a type to be forcibly driven through a workpiece into a steel substrate, via a powder-actuated tool. The steel pin has a substantially sharp point, which is reshaped so that such point has substantially true concentricity, so that surface-texture irregularities on such point are reduced, and so that such point appears under high magnification to be substantially free of other surface imperfections. This invention also pertains to a method for the manufacture of the steel pin.

BACKGROUND OF THE INVENTION

Frequently, powder-actuated tools are employed to drive steel pins or fasteners through workpieces into steel, concrete, or masonry substrates. A powder-actuated tool employs a powder charge, which undergoes explosive combustion.

High velocity tools, those without pistons, are no longer produced in the industry. Current low velocity, powder-actuated tools drive the steel pins or fasteners by means of a piston disposed between the charge and the steel pin. These current low velocity tools result in lower velocity of the steel pin and thus lower energy imparted to the pin. Without proper design and manufacture of the steel pin or fastener, these tools may not have sufficient energy to drive a fastener into a steel substrate deeply enough to provide adequate or consistent holding values to satisfy the needs of a specific application. Without a properly designed pin, some would-be powder-actuated tool users may opt for other methods of holding articles to steel or concrete, such as inserting a fastener into a drilled hole.

Typically, such a pin is manufactured by drawing a steel wire to a desired diameter, cutting a length of the drawn wire while deforming one end of the length to form a head, and deforming the other end thereof to form a point. Typically, the steel pin is next heat-treated, as by austempering which produces a ductile core in combination with surface decarburization, and then plated with zinc, as by electrogalvanizing. Various additional coatings may be also applied to further improve corrosion resistance.

Commonly, the point is formed either by swaging the wire end or by pinch pointing, which refers to forging the wire end between two matched dies. Each point-forming process, as practiced heretofore, has its own shortcomings.

Swaging is a slower process. Swaging tends to form a protuberance at the point. The protuberance tends to bend over, to deflect the steel pin, and to increase resistance to penetration, particularly as the steel pin is driven initially against a steel surface, whereby it may be unduly difficult to maintain perpendicularity of the steel pin relative to the steel surface.

Pinch pointing is a faster process. Pinch pointing tends to form a cleft where the matched dies come together at the tip. Because of its striking appearance under high magnification (e.g. 60× magnification) the cleft that is formed is known as a "fish mouth" to persons involved with the manufacture of steel pins.

In addition to resulting in a tip having either a protuberance or a "fish mouth", both swaging and pinch pointing processes make it difficult to produce a smooth transition, which is required, where the pointed end of the steel pin meets the cylindrical shank of the steel pin.

Generally, a "fish mouth" cleft does not seem to interfere unduly with driving of a steel pin having such a cleft into a concrete or masonry substrate via a powder-actuated tool, even if the steel pin must be initially driven through a thin-walled steel workpiece. However, such a cleft tends to increase resistance to penetration to such a high level that a steel pin having such a cleft cannot be effectively driven via a low velocity powder-actuated tool so as to penetrate deeply into a steel substrate. Although a larger powder charge aids penetration of a steel pin into a steel substrate, such penetration is not always successful even if such a charge is employed.

When a low velocity tool is employed, penetration of a steel pin having such a cleft into a steel substrate tends to be arrested before all energy from the powder charge that has been employed has been spent, whereupon the steel pin may break along its shank. It may be similarly difficult to drive a steel pin having such a cleft through a thick-walled steel workpiece via a powder-actuated tool.

Other alternative mechanical processes for forming a point on such a pin include turn pointing and roll pointing. These processes leave undesirble flaws, such as grooves in the point or a sharp transition between the point and the shank. It is believed that, in every pin such known to the prior art, there is some section that has a gross surface imperfection deviating from the desired ogive shape.

Heretofore, it has been known to remove slight imperfections and small burrs by tumbling steel pins upon themselves, with or without media. As practiced heretofore, tumbling only is not entirely satisfactory, as tumbling tends to distort the clefts or protuberances on the points of the tumbled pins. Because of the distorted points, it can be more difficult to maintain perpendicularity of such pins relative to steel substrates, and resistance to penetration of such pins into steel substrates tends to be also increased.

The purpose of tumbling practiced heretofore was to remove flash or upstanding thin-walled protuberances on the steel pin, commonly known as deburring. The purpose was not to remove steel from most of the surface of the tip of the pin.

TERMS USED HEREIN

References are made hereinafter to an ogive, which is the curved or tapered front portion of a projectile having a cylindrical body, or equivalently of a steel pin having a cylindrical shank, which has a shank diameter. An ogive is generated by a circular arc or a straight taper, which arc or which taper is rotated 360° about a central axis. A tangent or true ogive is generated by a circular arc tangent to the generator of the cylindrical surface of the cylindrical body or equivalently of the cylindrical shank. As generated by a circular arc, a tangent or true ogive has a radius, which is the radius of the circular arc. A secant ogive is generated by a circular arc not tangent to, but intersecting at a small angle, the cylindrical surface thereof. A conical ogive is generated by a straight taper intersecting the cylindrical surface thereof.

References are made hereinafter to a roughness-height index value, which is a number that equals the arithmetical average deviation of minute surface irregularities from a hypothetical perfect surface, as expressed either in microinches (μin) or micrometers (μm). Surface-texture measurements expressed as roughness-height index values and related topics are explained in Broadston, "Surface-Texture Designation, Production, and Control", which is a chapter in Baumeister et al., *Marks' Standard Handbook for Mechanical Engineers*, Eighth Edition, McGraw-Hill Book Company, New York (1978) at pages 13–73 et seq.

As explained in Broadston, supra, flaws in a surface are not considered in surface-texture measurements. Accordingly, references made herein to other surface imperfections refer to clefts, protuberances, and other flaws that are not considered in surface-texture measurements, which flaws include but are not limited to those flaws created by mechanical point-forming processes.

Also, tip radius is defined as the radius at the very tip of the pin.

SUMMARY OF THE INVENTION

This invention has resulted from efforts to reduce resistance to penetration of a steel pin into a steel substrate, particularly a steel pin having a forged point having a "fish mouth" cleft, as described above.

This invention provides a steel pin having a substantially sharp point, which is reshaped so as to provide substantially true point concentricity, reduce surface-texture irregularities, and eliminate other surface imperfections apparent under high magnification. This invention also provides a method for the manufacture of the steel pin.

Broadly, the substantially sharp point has surface-texture irregularities with a roughness-height index not greater than about 30 microinches (about 0.76 micrometers) and appears to be substantially free of other surface imperfections when viewed under high magnification, specifically when viewed under 60× magnification. Preferably, for some applications, the substantially sharp point has surface-texture irregularities with a roughness-height index value in a range from about 10 microinches (about 0.25 micrometers) to about 15 microinches (about 0.38 micrometers).

Desirably, the substantially sharp point conforms substantially to an ogive except that the substantially sharp point has a substantially spherical tip. Desirably, the substantially spherical tip has a radius in a range from about 0.02 inch (about 5 millimeters) to about 0.03 inch (about 7.5 millimeters).

Preferably, the steel pin has a substantially cylindrical shank joined to the substantially sharp point at a transition having a substantially smooth, continuously curved surface. In one contemplated embodiment, the substantially cylindrical shank is knurled near the transition, although it is not necessary for the substantially cylindrical shank to be so knurled.

From efforts to optimize the tradeoff between ease of penetration and holding power, it seems to be particularly preferable for the substantially sharp point to conform substantially to a tangent ogive, which has an ogive radius about ten times the shank diameter and an ogive length about twice the shank diameter, except that the substantially sharp point has a substantially spherical tip, which has a radius about 0.1 times the shank diameter, particularly but not exclusively if the substantially sharp point has surface-texture irregularities with a roughness-height index in a range from about 15 microinches (about 0.83 micrometers) to about 30 microinches (about 0.76 micrometers). The ogive length includes the tip radius.

When a steel pin is made by the method provided by this invention, a length of steel wire is deformed so as to form a steel pin with a substantially cylindrical shank and with a substantially sharp point, which extends from one end of the substantially cylindrical shank and which may be made by one of the common mechanical pointing processes. The substantially sharp point is reshaped so that the substantially sharp point has substantially true concentricity, so that surface-texture irregularities on the substantially sharp point have a roughness-height index value not greater than about 30 microinches, and so that the substantially sharp point appears to be substantially free of other surface imperfections when viewed under 60× magnification. Such imperfections include those caused or left by the common mechanical pointing processes.

Preferably, the substantially sharp point is reshaped so that surface-texture irregularities on the substantially sharp point have a roughness-height index value in a range from about 10 microinches (about 0.25 micrometers) to about 30 microinches (about 0.76 micrometers) whereby a smooth transition from the substantially sharp point to the substantially cylindrical shank is achieved. Desirably, the substantially sharp point is reshaped so as to have a substantially spherical tip and so as to conform substantially to an ogive except for the substantially spherical tip. Desirably, the substantially sharp point is reshaped so that the substantially spherical tip has a radius in a range from about 0.02 inch (about 5 millimeters) to about 0.03 inch (about 7.5 millimeters).

Preferably, the substantially pointed end is reshaped by barrel finishing the steel pin in finishing media. Another term for barrel finishing, as employed for purposes of this invention, is tumble pointing. Alternatively, the substantially sharp point is reshaped by abrasively finishing the steel pin in a cylindrical disc machine, in which an abrasive-coated disc is rotated to throw the steel pin repeatedly against abrasive-coated sidewalls.

Tumbling or deburring, as practiced in the prior art, was not intended to change the tip radius or the overall shape of a pin point. According to this invention, however, the substantially sharp point is reshaped so as to have a substantially spherical tip which desirably has a radius in the range noted above, as well as a smooth surface finish, smooth transitions, and freedom from gross irregularities.

Preferably, deforming the length of steel wire includes forging one end of the length of steel wire so as to cause the forged end to become the substantially sharp point of the steel pin. Alternatively, deforming the length of steel wire includes swaging, turn pointing, or roll pointing one end of the length of steel wire so as to cause the swaged end to become the substantially sharp point of the steel pin.

These and other objects, features, and advantages of this invention are evident from the following description of a preferred mode for carrying out this invention with reference to the accompanying drawings.

BRIEF DESCRIPTION OF THE DRAWINGS

FIG. 5 exemplifies prior art.

FIG. 7 exemplifies prior art.

FIG. 9 exemplifies prior art.

FIG. 11 exemplifies prior art.

DETAILED DESCRIPTION OF PREFERRED MODE

Figure 1:
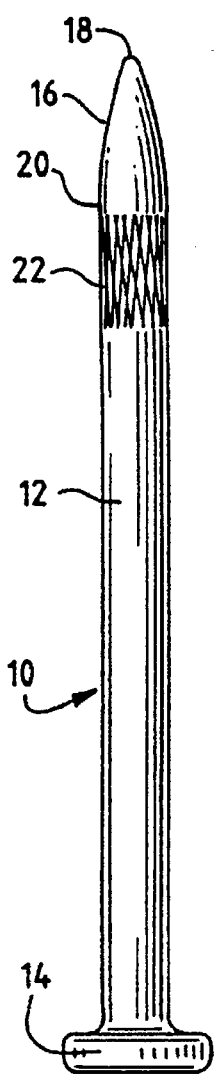
FIG. 1 is an elevational view of a steel pin embodying this invention, in a larger size, with a head, a shank having a knurled portion, and a substantially sharp point.

As shown in FIG. 1, a steel pin 10 of a larger size constitutes a first embodiment of this invention. The pin 10 has a relatively long, substantially cylindrical shank 12 having a given diameter, a head 14 having a larger diameter and formed at one end of the shank 12, and a substantially sharp point 16 formed at and extending from the other end of the shank 12. The point 16 conforms substantially to an ogive, particularly to a secant or tangent ogive, except that the point 16 has a substantially spherical tip 18. The point 16 is joined to the shank 12 at a transition 20. The shank 12 has a knurled portion 22 near the transition 20.

Figure 2:
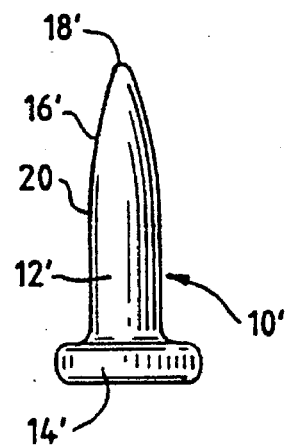
FIG. 2 is an elevational view of a steel pin embodying this invention, in a smaller size, with head, a shank that is not knurled, and a substantially sharp point.

As shown in FIG. 2, a steel pin 10' of a smaller size constitutes a second embodiment of this invention. The pin 10' has a relatively short, substantially cylindrical shank 12' having a given diameter, a head 14' having a larger diameter and formed at one end of the shank 12', and a substantially sharp point 16' formed at and extending from the other end of the shank 12'. The point 16' conforms substantially to an ogive, particularly to a secant ogive, except that the point 16' has a substantially spherical tip 18'. The point 16' is joined to the shank 12' at a transition 20'. The shank 12' does not have a knurled portion. The length of the shank 12' depends upon what is to be fastened to the substrate.

Although the points 16, 16', conform substantially to a secant ogive, this invention may be also embodied in a steel pin having a substantially sharp point conforming substantially to a tangent ogive.

The substantially sharp point of each of the steel pins 10, 10', has surface-texture irregularities with a roughness-height index value in a range from about 10 microinches (about 0.25 micrometers) to about 30 microinches (about 0.76 micrometers). Further, the substantially sharp point of each of the steel pins 10, 10', appears to be substantially free of other surface imperfections when viewed under high magnification, specifically when viewed under 60× magnification.

The substantially sharp point of each of the steel pins 10, 10', has substantially true concentricity. The substantially spherical tip of the substantially sharp point of each of the steel pins 10, 10', has a radius in a range from about 0.015 inch (about 3.75 millimeters) to about 0.03 inch (about 7.5 millimeters). Also, on each of the steel pins 10, 10', the transition between the substantially sharp point and the substantially cylindrical shank has a substantially smooth, continuously curved surface. In each of the illustrated embodiments, except for the substantially spherical tip, the substantially sharp point conforms substantially to a secant or tangent ogive.

Having a substantially sharp point that has substantially true concentricity and a roughness-height index value not greater than about 30 microinches (about 0.76 micrometers) and that appears to be substantially free of other surface imperfections when viewed under high magnification, specifically when viewed under 60× magnification, are characteristics which distinguish each of the steel pins 10, 10', from steel pins sold and used previously. Having a point that is free from gross irregularities because substantially all traces of mechanical intersections have been removed is another characteristic which distinguishes each of the steel pins 10, 10', from steel pins sold and used previously. Having a point that conforms substantially to an ogive except that the point has a substantially spherical tip is another characteristic which distinguishes each of the steel pins 10, 10', from steel pins sold and used previously.

A steel pin having these characteristics offers significant advantages over a steel pin lacking these characteristics. Because the point of a steel pin having these characteristics has substantially true concentricity, the point does not interfere with maintaining perpendicularity between the steel pin and a steel substrate. Outward flow of the steel that is displaced as a steel pin having these characteristics penetrates a steel substrate tends to be uniformly concentric, whereby initial frictional forces imparted to the steel pin and to the steel substrate as the steel pin begins to penetrate the steel substrate are minimized.

Preferably, as explained below, a steel pin having these characteristics is made so that surface-texture irregularities on its shank are similar to surface-texture irregularities on its point. Advantageously, therefore, resistance of the steel pin to withdrawal from the steel substrate is maximized. Because of the lack of gross irregularities on the steel pin and because of the smooth surface of the steel pin, there is more surface contact between the steel pin and the steel substrate.

Figure 3:
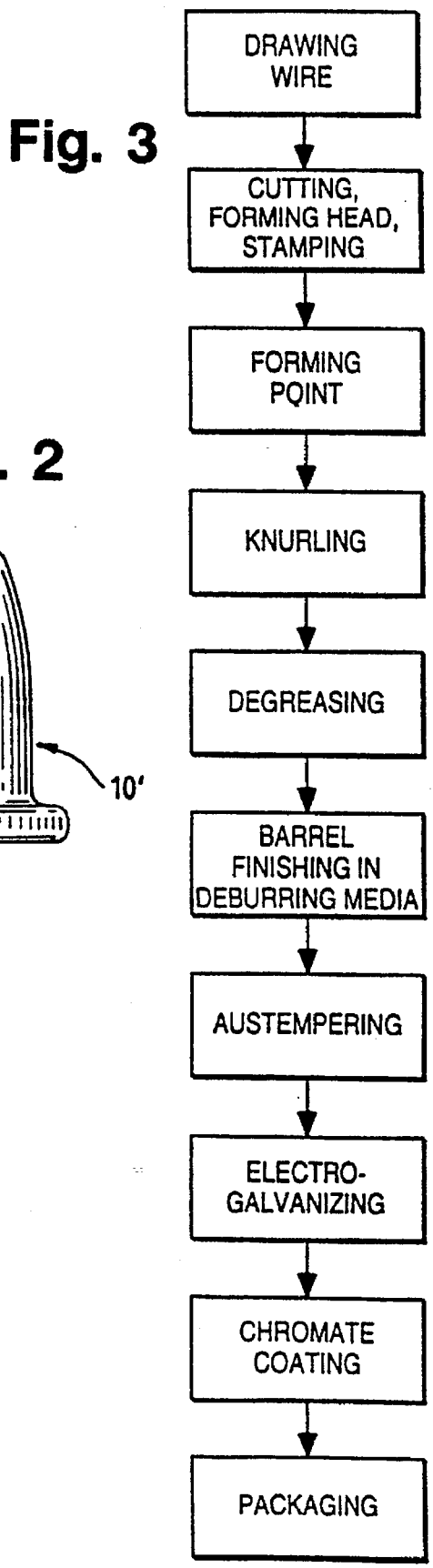
FIG. 3 is a flow chart of preferred major steps in the manufacture of the steel pin shown in FIG. 1. Preferred major steps in the manufacture of the steel pin shown in FIG. 2 are similar except that a knurling step is omitted.

Preferred major steps in the manufacture of the steel pin 10 are charted in FIG. 3. Preferred major steps in the manufacture of the steel pin 10' are similar except that a knurling step described below is omitted.

Initially, in the manufacture of a steel pin, a steel wire is drawn from an initial diameter to a desired diameter. Conventional equipment is employed in this step.

Thereupon, a length is cut from the drawn wire, the head is formed on one end of the cut length, and the head is stamped with a manufacturer's mark. Conventional equipment is employed in these steps.

Thereupon, conventional pinch pointing equipment is employed to form the point on the other end of the same length, which between the head and the point becomes the shank of the steel pin. Thus, as exemplified in the photomicrograph that is FIG. 5, the point has a pronounced "fish mouth" cleft.

Presently, it is preferred to employ a Hartford High Speed Point Former (Model 5-700) which is available commercially from The Hartford Special Machinery Co. of Simsbury, Conn., to form the point with a metal removal process.

Knurling refers to forming a pattern of depressions, or raised areas, on the shank of a fastener for the primary purpose of increasing the holding power of the fastener.

If the shank of the steel pin is to have a knurled portion near the transition between the shank and the point, conventional equipment is employed to knurl the shank portion. As shown in FIG. 3, this knurling step is practiced between the point-forming step and the next step. Alternatively, this knurling step is practiced between the wire-cutting, head-forming, and head-stamping steps and the point-forming step. This knurling step is employed in the manufacture of the steel pin 10 but is omitted in the manufacture of the steel pin 10'.

The next step is a degreasing step, in which conventional solvents are employed in conventional equipment to degrease the steel pin, as formed in the prior steps.

After the steel pin has been degreased, the steel pin is reshaped by barrel finishing or tumble pointing the steel pin in finishing media over an extended period, whereby the steel pin is provided with the characteristics which distinguish the steel pins 10, 10', from steel pins known and used previously. The barrel finishing or tumble pointing step removes substantilly all traces of mechanical intersections that were left on the steel pin after the point was formed. Barrel finishing in finishing media is known also as media finishing.

Conventional finishing media may be suitably used, such as Ceratech Ceramic Media (⅝"×¼"). Conventional barrel finishing or media finishing equipment may be suitably employed, along with a magnetic separator with a demagnetizer, a spin dryer, and a wire spin basket. Alternatively, vibratory finishing equipment with appropriate media may also be used.

In successive steps after the steel pin has been barrle finished in finishing media for the extended period, the steel pin is heat treated by austempering which produces a ductile core in combination with surface decarburization, plated with zinc by electrogalvanizing, coated with a protective chromate, and packaged.

The extended period, possibly approaching 100 hours, over which the steel pin must be barrel finished in finishing media to provide the steel pin with the characteristics noted above, is determined empirically with due regard to the finishing media that are employed and the finishing equipment that is employed.

Alternatively, the substantially sharp point is reshaped by abrasively finishing the steel pin in a cylindrical disc machine, in which an abrasive-coated disc is rotated to throw the steel pin repeatedly against abrasive-coated sidewalls. Such a cylindrical disc machine, which is thought to be suitable, is available commercially from AAC Engineered Systems Inc. of Cinnaminson, N.J. Because such a cylindrical disc machine is more aggressive, as compared to barrel finishing, fewer hours are required for metal removal.

Alternatively, the knurling step may follow rather than precede the reshaping step, which involves barrel finishing, tumble pointing, or abrasively finishing, as described above. It is preferable, in some instances, for the knurling step to follow the reshaping step.

Figure 4:
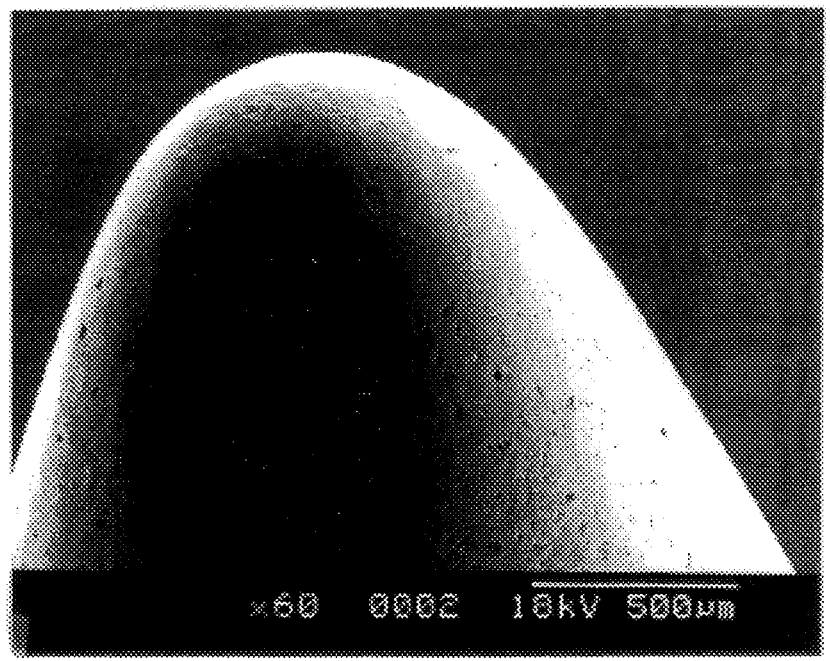
FIG. 4 is a photomicrograph (at 60× magnification) of a substantially sharp point formed on a steel pin by a pinch pointing process after the substantially sharp point has been reshaped by barrel finishing in finishing media for a prescribed time for the purposes of the purposes of this invention.
Figure 5:
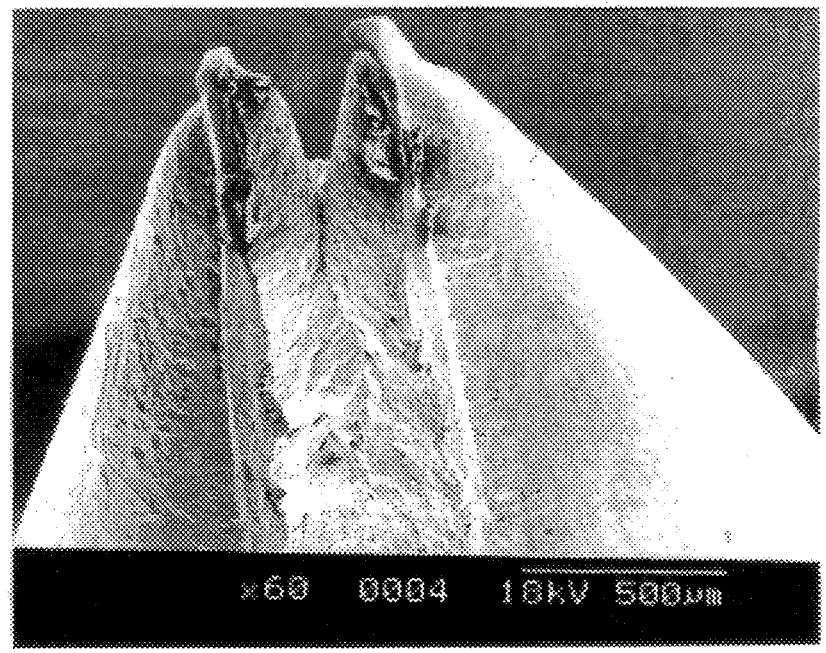
FIG. 5 is a photomicrograph (at 60× magnification) of a substantially sharp point formed on a steel pin by a pinch pointing process before the substantially sharp point is reshaped for the purposes of this invention. A pronounced "fish mouth" cleft is visible.
Figure 6:
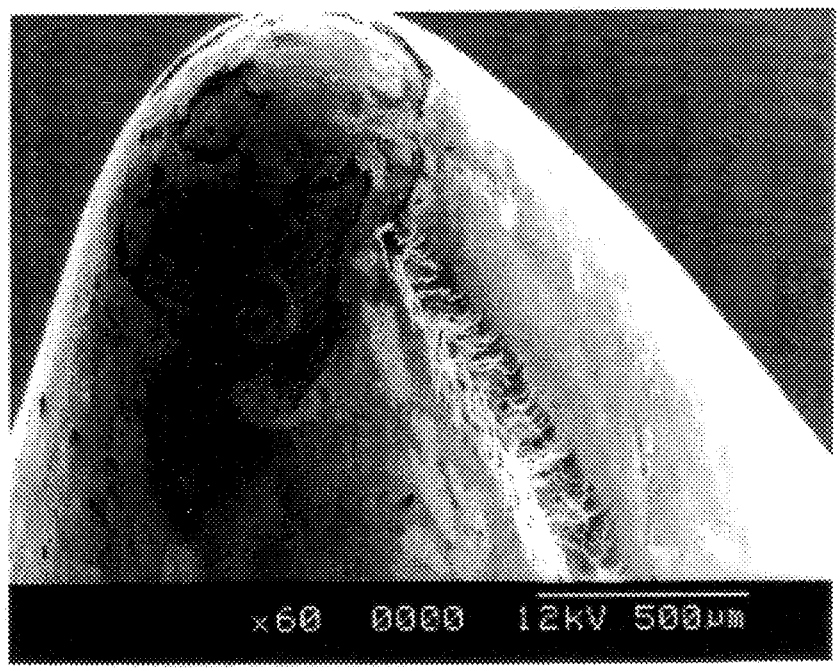
FIG. 6 is a photomicrograph (at 60× magnification) of a substantially sharp point formed on a steel pin by a pinch pointing process after the substantially sharp point has been reshaped by barrel finishing in finishing media for 28 hours for the purposes of this invention.

It is informative to compare the photomicrographs that are included as FIGS. 4, 5, and 6. FIG. 4 illustrates the substantially pointed end provided on a steel pin by pinch pointing, after barrel finishing of the steel pin in finishing media for 40 hours, whereby the substantially pointed end has no apparent "fish mouth" cleft.

FIG. 5 illustrates the substantially pointed end provided on a steel pin by pinch pointing, before barrel finishing of the steel pin has begun, the substantially pointed end having a very pronounced "fish mouth" cleft. FIG. 6 illustrates the substantially pointed end provided on a steel pin by pinch pointing, after barrel finishing of the steel pin in finishing media for 28 hours, whereby the "fish mouth" cleft appears to be substantially reduced but not entirely eradicated.

As seen in FIG. 5, the point tip radius of a prior art pinch-pointed pin is difficult to ascertain due to the "fish Mouth" cleft. The point tip radius of a pin substantially similar to this pin was determined, as noted in Table I, by looking at the pin from the side so that the "fish mouth" cleft was not seen. The tip radius was measured on one of the two sides of the "fish mouth" cleft. As shown in FIG. 4, after barrel finishing or tumble pointing for 28 hours or 40 hours, the tip radius can be taken at any rotational angle because the tip is truly concentric.

Moreover, as seen in Table I, the tip radius after barrel finishing or tumble pointing is larger than the tip radius of the original pinch-pointed pin. It can be appreciated that this would also apply to a pin point originally made by swaging.

Barrel finishing or tumble pointing of a steel pin reduces all of its exterior dimensions, not merely its substantially pointed end, as exemplified by the following data obtained from three specimen pins reshaped as described herein. The following data also show, from shortening of various dimensions, that barrel finishing or tumble pointing not only removes upstanding flash or protuberances but also removes metal from the steel pin in its entirety.

TABLE I

| Specimen | Dimension | Before Reshaping | After Reshaping 28 Hours | After Reshaping 40 Hours | Change (%) 28 Hours | Change (%) 40 Hours |
|---|---|---|---|---|---|---|
| Specimen A | Knurl Diameter | 0.154 inch | 0.150 inch | knurl not measured | 2.6% | |
| | Shank Length | 0.615 inch | 0.592 inch | 0.575 inch | 3.7% | 6.5% |
| | Head Diameter | 0.298 inch | 0.297 inch | 0.295 inch | 0.3% | 1% |
| | Ogive Length | 0.237 inch | 0.220 inch | 0.212 inch | 7% | 11% |
| | Point Tip Radius | 0.010 inch | 0.018 inch | 0.022 inch | 180% | 220% |
| | Fish Mouth | 0.009 inch | nil | nil | | |
| | Shank Diameter | 0.150 inch | 0.150 inch | 0.146 inch | nil | 2.6% |
| Specimen B | Knurl Diameter | 0.152 inch | 0.149 inch | knurl not measured | 2% | |
| | Shank Length | 0.739 inch | 0.718 inch | 0.696 inch | 2.9% | 6% |
| | Head Diameter | 0.298 inch | 0.297 inch | 0.295 inch | 0.3% | 1% |
| | Ogive Length | 0.231 inch | 0.209 inch | 0.191 inch | 9.5% | 17% |
| | Point Tip Radius | 0.010 inch | 0.020 inch | 0.024 inch | 200% | 240% |
| | Fish Mouth | 0.007 inch | nil | nil | | |
| | Shank Diameter | 0.150 inch | 0.150 inch | 0.146 inch | nil | 2.6% |
| Specimen C | Knurl Diameter | 0.154 inch | 0.149 inch | knurl not measured | 3% | |
| | Shank Length | 0.866 inch | 0.832 inch | 0.814 inch | 4% | 6% |
| | Head Diameter | 0.298 inch | 0.297 inch | 0.294 inch | 0.3% | 1% |
| | Ogive Length | 0.228 inch | 0.199 inch | 0.190 inch | 13% | 17% |
| | Point Tip Radius | 0.012 inch | 0.023 inch | 0.028 inch | 192% | 233% |
| | Fish Mouth | 0.017 inch | nil | nil | | |
| | Shank Diameter | 0.150 inch | 0.150 inch | 0.146 inch | nil | 2.6% |

Tables II, III, and IV report hardness data taken at cross-sections after steel pin D was driven into steel plate D, after steel pin E was driven into steel plate E, and after steel pin F was driven into steel plate F. Steel pin D, which embodied this invention, was a steel pin having a substantially pointed end formed by a pinch-pointing process and reshaped as described above. Steel pins E and F, which did not embody this invention, were commercially available pins having substantially pointed ends formed by a swaging process but not reshaped as described above.

If there is a phase change from martensite to ferrite near the surface of a steel pin, as a result of high frictional heating when the steel pin is driven into a steel plate, the surface hardness of the steel pin and its shear strength near its surface are reduced markedly. In view of the available data including the data indata in Tables II, III, and IV, it has been concluded that there is less frictional heating and less resultant deterioration in pin surface hardness when a steel pin embodying to this invention is driven into a steel plate.

TABLE II

| Specimen | Core or Depth from Surface | Hardness Measured on Knoop Scale | Hardness Converted to Rockwell Scale Noted |
|---|---|---|---|
| Steel Pin D | Core | 635.4 | 59 C |
| | Core | 642.1 | 59 C |
| | Core | 652.4 | 60 C |
| | 0.040 inch | 612.7 | 58 C |
| | 0.020 inch | 487.8 | 50 C |
| | 0.010 inch | 422.4 | 45 C |
| | 0.005 inch | 390.1 | 42 C |
| | 0.002 inch | 400.8 | 43 C |
| Steel Plate D | Core | 167.3 | 86 B |
| | Core | 169.1 | 86 B |
| | Core | 161.2 | 84 B |
| | 0.060 inch | 201.7 | 93 B |
| | 0.040 inch | 214.2 | 96 B |
| | 0.020 inch | 256.3 | 26 C |
| | 0.010 inch | 257.1 | 26 C |
| | 0.005 inch | 269.5 | 28 C |
| | 0.002 inch | 237.0 | 36 C |

TABLE III

| Specimen | Core or Depth from Surface | Hardness Measured on Knoop Scale | Hardness Converted to Rockwell Scale Noted |
| --- | --- | --- | --- |
| Steel Pin E Prior Art | Core | 642.1 | 57 C |
|  | Core | 608.0 | 56 C |
|  | Core | 603.4 | 55 C |
|  | 0.040 inch | 517.0 | 50 C |
|  | 0.020 inch | 419.7 | 43 C |
|  | 0.010 inch | 264.6 | 25 C |
|  | 0.005 inch | 185.5 | 90 B |
|  | 0.002 inch | Hardness not measured due to distortion |  |
| Steel Plate E Prior Art | Core | 136.9 | 75 B |
|  | Core | 147.1 | 79 B |
|  | Core | 148.9 | 80 B |
|  | 0.060 inch | 231.0 | 99 B |
|  | 0.040 inch | 229.6 | 98 B |
|  | 0.020 inch | 238.1 | 100 B |
|  | 0.010 inch | 195.9 | 92 B |
|  | 0.005 inch | 179.1 | 89 B |
|  | 0.002 inch | 118.0 (?) | 67 B |

TABLE IV

| Specimen | Core or Depth from Surface | Hardness Measured on Knoop Scale | Hardness Converted to Rockwell Scale Noted |
| --- | --- | --- | --- |
| Steel Pin F Prior Art | Core | 592.8 | 55 C |
|  | Core | 581.0 | 54 C |
|  | Core | 606.5 | 56 C |
|  | 0.040 inch | 597.3 | 55 C |
|  | 0.020 inch | 550.2 | 52 C |
|  | 0.010 inch | 469.3 | 47 C |
|  | 0.005 inch | 275.6 | 26 C |
|  | 0.002 inch | 208.1 | 95 B |
| Steel Plate F Prior Art | Core | 150.5 | 80 B |
|  | Core | 153.4 | 81 B |
|  | Core | 160.3 | 83 B |
|  | 0.060 inch | 198.5 | 93 B |
|  | 0.040 inch | 223.9 | 97 B |
|  | 0.020 inch | 252.9 | 23 C |
|  | 0.010 inch | 272.3 | 26 C |
|  | 0.005 inch | 265.0 | 25 C |
|  | 0.002 inch | 269.1 | 26 C |

Hardness data in Tables II, III, and IV also indicate that ferrite is not formed from martensite near the surface of a steel pin made in accordance with this invention and driven into a steel plate but that ferrite is formed from martensite near the surface of a steel pin made in accordance with the prior art and driven into a steel plate. In Tables II, III, and IV, higher hardness values (e.g. Rockwell 42 C to Rockwell 60 C) are indicative of martensite being present, whereas lower hardness values (e.g. Rockwell 25 C, Rockwell 26 C, Rockwell 90 B, and Rockwell 95 B) are indicative of ferrite being present.

Further evidence that there is less frictional heating is available from photomicrographic studies of changes of martensitic structures to ferritic structures when steel pins are driven into steel plates. It is informative to compare FIGS. 8 and 9.

Figure 8:
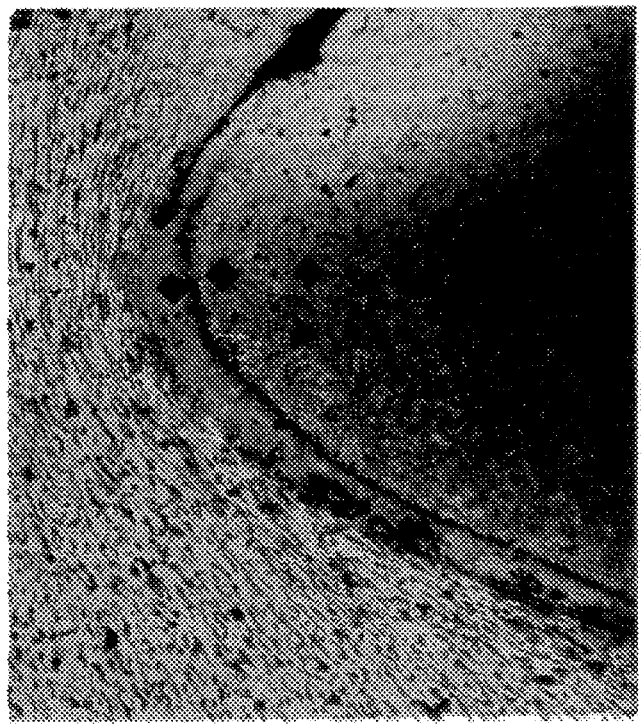
FIG. 8 is a photomicrograph (at 100× magnification) of a cross-section through the substantially pointed end of a steel pin and through a steel plate after the steel pin has been driven into the steel plate. The substantially pointed end was formed by a pinch-pointing process and the steel pin was reshaped as described below. Geometric shapes in FIG. 8 are artifacts due to hardness tests.
Figure 9:
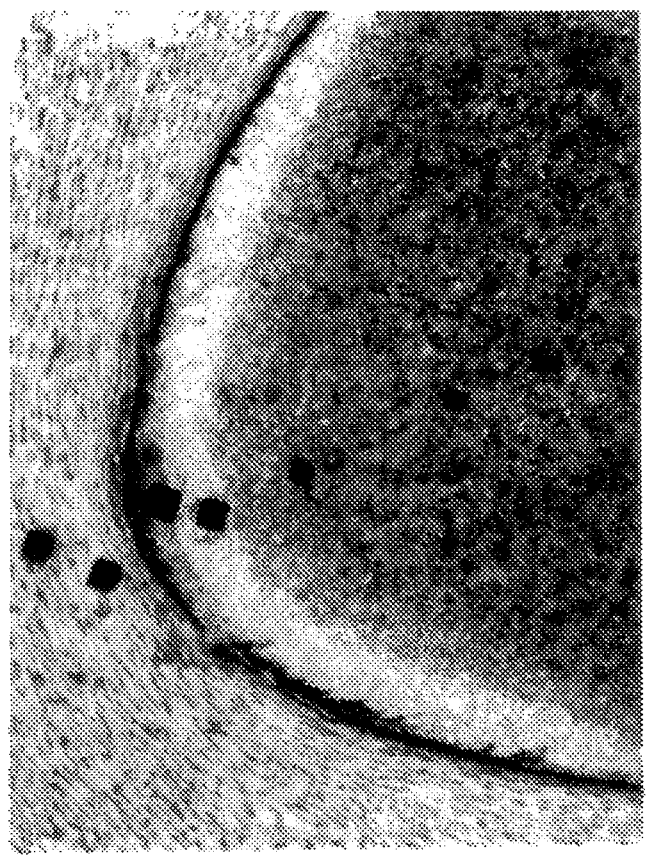
FIG. 9 is a photomicrograph (at 100× magnification) of a cross-section through the substantially pointed end of a steel pin and through a steel plate after the steel pin has been driven into the steel plate. The substantially pointed end was formed by a swaging process and was not reshaped as described below. Geometric shapes in FIG. 9 are artifacts due to hardness tests.

In FIG. 8, which illustrates a steel pin made in accordance with this invention and driven into a steel plate, the steel pin does not exhibit a significant number of large grains, which are indicative of ferrite being present. In FIG. 9, which illustrates a steel pin made in accordance with the prior art and driven into a steel plate, a significant number of large grains appear, which are indicative of ferrite being present.

Because a steel pin that has been reshaped as described above has surface-texture irregularities with a roughness-height index value not greater than about 30 microinches and appears to, be substantially free of other surface imperfections when viewed under 60× magnification, better surface-to-surface contact is achieved not only at the substantially pointed end but also along the substantially cylindrical shank when the steel pin is driven into a steel plate, as compared to steel pins known and used heretofore, which allows for better holding power of the steel pin. That better surface-to-surface contact is achieved is illustrated by FIGS. 8 through 11. A dark region leading to the upper edge of FIG. 8 is believed to be an entrapment of zinc that had been used to coat the steel pin.

Figure 10:
FIG. 10 is a photomicrograph (at 50× magnification) of a cross-section through the substantially cylindrical shank of a steel pin and through a steel plate after the steel pin has been driven into the steel plate. The steel pin, which has a substantially pointed end formed by a pinch-pointing process, was reshaped as described below.
Figure 11:
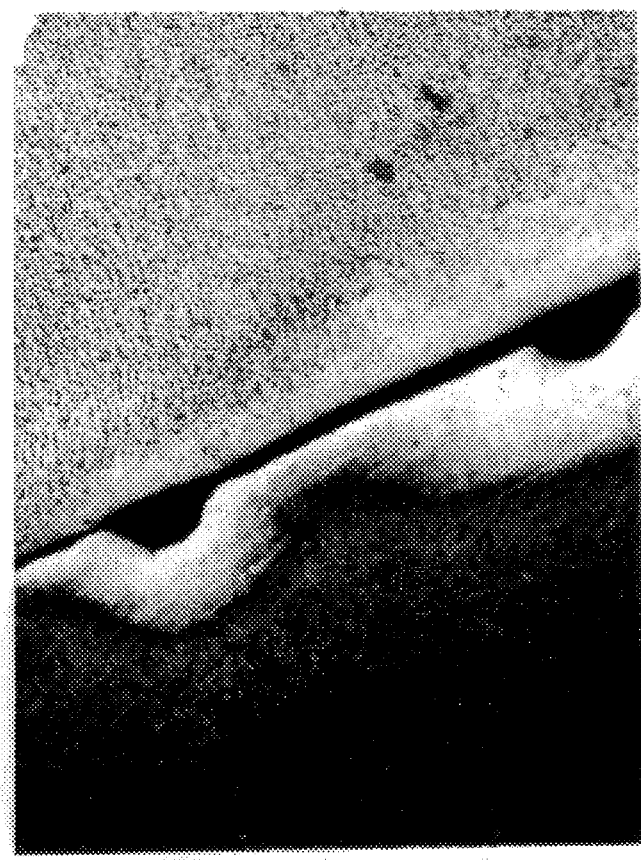
FIG. 11 is a photomicrograph (at 50× magnification) of a cross-section through the substantially cylindrical shank of a steel pin and through a steel plate after the steel pin has been driven into the steel plate. The steel pin, which had a substantially pointed end formed by a swaging process, was not reshaped as described below.

When FIGS. 10 and 11 are compared, it is evident that the surface of the steel pin shown in FIG. 10 and made in accordance with this invention appears to have surface-to-surface contact over about 55% of the surface area between the steel pin and the steel plate and to be substantially smooth, after the steel pin has been driven into a steel plate. A dark region shown between the pin surface and the plate surface, along the surface area therebetween, is believed to be comprises of zinc that had been used to coat the steel pin. Furthermore, it is evident that the surface of the steel pin shown in FIG. 11 and made in accordance with the prior art appears to have surface-to-surface contact over about 55% of the surface area between the steel pin and the steel plate and to have large voids, which are believed to have resulted from irregular flow of the substrate steel of the steel plate over the pin surface, and which thus increase the resistance of the steel pin to penetration of a steel substrate.

As described above, this invention alleviates two problems that have been attributed to surface irregularities on the pin point, when a steel pin is driven into a steel plate. One such problem is that surface irregularities cause high frictional resistance, which produces high heat and causes a phase change of martensite to ferrite near the surface. Ferrite is weaker than martensite in shear strength. The other problem is that surface irregularities produce surface voids, which are attributable to irregular flow of the substrate steel over the pin surface.

Figure 7:
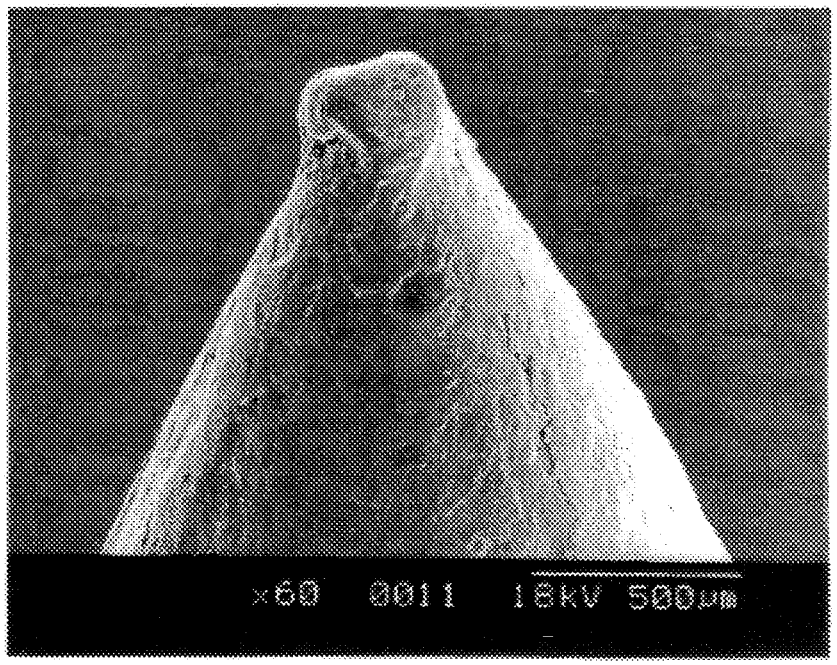
FIG. 7 is a photomicrograph (at 60× magnification) of a substantially sharp point formed on a steel pin by a swaging process before the substantially sharp point is reshaped for the purposes of this invention. A small protuberance at the substantially sharp point is visible.

Although this invention has been described primarily in connection with a steel pin having a forged point, as exemplified in FIG. 5, this invention may be alternatively used in connection with a steel pin having a swaged point, as exemplified in FIG. 7.

In summary, this invention comprises removing traces of mechanical intersections that may be left on the substantially sharp point after deforming of the length of steel wire by known mechanical processes. This invention also comprises providing a steel pin so that surface-texture irregularities on the substantially sharp point of the steel pin have a roughness-height index value not greater than about 30 microinches.

Various other modifications may be made without departing from the scope and spirit of this invention.

We claim:

1. A steel pin which is adapted to be driven into a substrate by means of a low-velocity tool, comprising:

a substantially cylindrical shank having a predetermined diametrical extent; and a substantially sharp point defined upon one end of said substantially cylindrical shank, said substantially sharp pointed end of said steel pin shank;

said substantially sharp pointed end of said steel pin shank has surface-texture irregularities which have a roughness-height index value not greater than approximately 30 microinches;

said substantially sharp pointed end of said steel pin shank is substantially free of surface imperfections when viewed under 60× magnification; and said substantially sharp point has a configuration that conforms substantially to that of an ogive having an ogive radius which is approximately ten times said diametrical extent of said substantially cylindrical shank such that penetration of said steel pin into a substrate, as driven by a low-velocity tool, is facilitated.

2. The steel pin of claim 1 wherein the substantially sharp point conforms substantially to an ogive except that the substantially sharp point has a substantially spherical tip.

3. The steel pin as set forth in claim 2, wherein:

said substantially spherical tip has a radius which is approximately 0.1 times said predetermined diametrical extent of said substantially cylindrical shank.

4. The steel pin of claim 3 wherein the substantially spherical tip has a radius in a range from about 0.015 inch to about 0.03 inch.

5. The steel pin of claim 4 wherein the substantially cylindrical shank is joined to the substantially sharp point at a transition having a substantially smooth, continuously curved surface.

6. The steel pin of claim 5 wherein the substantially cylindrical shank has a knurled portion near the transition.

7. A steel pin which is adapted to be driven into a substrate by means of a low-velocity tool, comprising:

a substantially cylindrical shank having a predetermined diametrical extent; and a substantially sharp point defined upon one end of said substantially cylindrical shank, said substantially sharp pointed end of said steel pin shank has a configuration that conforms substantially to that of an ogive with an ogive radius of approximately ten times said predetermined diametrical extent of said substantially cylindrical shank and with an ogive length of approximately twice said predetermined diametrical extent of said substantially cylindrical shank such that penetration of said steel pin into a substrate, as driven by a low-velocity tool, is facilitated; and said substantially sharp pointed end of said steel pin shank is free of surface imperfections when viewed under 60× magnification.

8. The steel pin of claim 7 wherein the substantially sharp point has a substantially spherical tip.

9. The steel pin of claim 8 wherein the substantially spherical tip has a radius about 0.1 times the shank diameter, the ogive length including the radius of the substantially spherical tip.

10. The steel pin as set forth in claim 9, wherein:

said radial extent of said spherical tip portion is within the range extending from approximately 0.015 inches to approximately 0.03 inches.

11. A steel pin which is adapted to be driven into a substrate by means of a low-velocity tool, comprising:

a substantially cylindrical shank having a predetermined diametrical extent; and a substantially sharp point defined upon one end of said substantially cylindrical shank, said substantially sharp pointed end of said steel pin shank has surface-texture irregularities which have a roughness-height index value which is within the range of from approximately 15 microinches to approximately 30 microinches;

said substantially sharp point of said substantially cylindrical shank has a configuration which conforms substantially to that of an ogive having an ogive radius which is approximately ten times said predetermined diametrical extent of said substantially cylindrical shank such that penetration of said steel pin into a substrate, as driven by a low-velocity tool, is facilitated; and said substantially sharp pointed end of said steel pin shank is free of surface imperfections when viewed under 60× magnification.

12. The steel pin as set forth in claim 11, wherein:

said substantially sharp point comprises a substantially spherical tip.

13. The steel pin as set forth in claim 12, wherein:

said substantially spherical tip has a radius which is approximately 0.1 times said predetermined diametrical extent of said substantially cylindrical shank.

14. The steel pin as set forth in claim 13, wherein:

said radius of said substantially spherical tip is within the range of approximately 0.015 inches to approximately 0.03 inches.

15. A steel pin which is adapted to be driven into a substrate by means of a low-velocity tool, comprising;

a substantially cylindrical shank having a predetermined diametrical extent; and a substantially sharp point defined upon one end of said substantially cylindrical shank, said substantially sharp pointed end of said steel pin shank has surface-texture irregularities which have a roughtness-height infex value which is within the range of from approximately 15 microinches to approximately 30 microinches;

said substantially sharp point of said substantially cylindrical shank has a configuration which conforms substantially to that of an ogive having an ogive radius which is approximately ten times said predetermined diametrical extent of said substantially cylindrical shank, a substantially spherical tip which has a radius of approximately 0.1 times said predetermined diametrical extent of said substantially cylindrical shank, and an ogive length, which includes said radius of said substantially spherical of approximately two times said predetermined diametrical extent of said substantially cylindrical shank, such that penetration of said steel pin into a substrate, as driven by a low-velocity tool, is facilitated; and said said substantially sharp pointed end of said steel pin shank is free of surface imperfections when viewed under 60× magnification.

16. The steel pin as set forth in claim 15, wherein:

said radius of said substantially spherical tip is within the range of approximately 0.015 inches to approximately 0.03 inches.

17. A steel pin which is adapted to be driven into a substrate by means of a low-velocity tool, comprising:

a substantially cylindrical shank having a predetermined diametrical extent; and a substantially sharp point defined upon one end of said substantially cylindrical shank, said substantially sharp pointed end of said steel pin shank has surface-texture irregularities which have a roughness-height index value which is not greater than approximately 30 microinches;

said substantially sharp point of said substantially cylindrical shank has a configuration which conforms substantially to that of an ogive having an ogive radius which is approximately ten times said predetermined diametrical extent of said substantially cylindrical shank, and a substantially spherical tip which has a radius which is approximately 0.1 times said predetermined diametrical extent of said substantially cylindrical shank, such that penetration of said steel pin into a substrate, as driven by a low-velocity tool, is facilitated; and said substantially sharp pointed end of said steel pin shank is free of surface imperfections when viewed under 60× magnification.

18. The steel pin as set forth in claim 17, wherein:

said radius of said substantially spherical tip is within the range of approximately 0.015 inches to approximately 0.03 inches.

19. A steel pin which is adapted to be driven into a substrate by means of a low-velocity tool, comprising:

a substantially cylindrical shank having a predetermined diametrical extent; and a substantially sharp point defined upon one end of said substantially cylindrical shank, said substantially sharp point having a configuration that conforms substantially to that of a ogive having an ogive radius which is approximately ten times said predetermined diametrical extent of said substantially cylindrical shank such that penetration of said steel pin into a substrate, as driven by a low-velocity tool, is facilitated.

20. The steel pin of claim 19 wherein the substantially sharp point conforms substantially to an ogive except that the substantially sharp point has a substantially spherical tip.

21. The steel pin as set forth in claim 20, wherein:

said substantially spherical tip has a radius which is within the range of approximately 0.015 inches to approximately 0.030 inches.

22. A steel pin which is adapted to be driven into a substrate by means of a low-velocity tool, comprising:

a substantially cylindrical shank portion having a predetermined diametrical extent; and a substantially sharp point defined upon one end of said substantially cylindrical shank portion, said substantially sharp point having a configuration that conforms substantially to that of an ogive having an ogive radius which is approximately ten times said predetermined diametrical extent of said substantially cylindrical shank portion, and further comprising a substantially spherical tip portion which has a radial extent which is approximately 0.1 times said predetermined diametrical extent of said substantially cylindrical shank portion such that penetration of said steel pin into a substrate, as driven by a low-velocity tool, is facilitated.

23. A steel pin which is adapted to be driven into a substrate by means of a low-velocity tool, comprising:

a substantially cylindrical shank portion having a predetermined diametrical extent; and a substantially sharp point defined upon one end of said substantially cylindrical shank portion, said substantially sharp point having a configuration that conforms substantially to that of an ogive having an ogive radius which is approximately ten times said predetermined diametrical extent of said substantially cylindrical shank portion, an ogive length which is approximately two times said predetermined diametrical extent of said substantially cylindrical shank portion, and further comprising a substantially spherical tip portion which has a radial extent which is approximately 0.1 times said predetermined diametrical extent of said substantially cylindrical shank portion such that penetration of said steel pin into a substrate, as driven by a low-velocity tool, is facilitated.

24. A steel pin which is adapted to be driven into a substrate by means of a low-velocity tool, comprising:

a substantially cylindrical shank portion having a predetermined diametrical extent; and a substantially sharp point defined upon one end of said substantially cylindrical shank portion, said substantially sharp point having a configuration that conforms substantially to that of an ogive having an ogive radius which is approximately ten times said predetermined diametrical extent of said substantially cylindrical shank portion, and an ogive length which is approximately two times said predetermined diametrical extent of said substantially cylindrical shank portion such that penetration of said steel pin into a substrate, as driven by a low-velocity tool, is facilitated.

25. The steel pin as set forth in claim 22, wherein:

said radial extent of said spherical tip portion is within the range of approximately 0.015 inches to approximately 0.03 inches.

26. The steel pin as set forth in claim 23, wherein:

said radial extent of said spherical tip portion is within the range extending from approximately 0.015 inches to approximately 0.03 inches.

\* \* \* \* \*